(12) United States Patent
Sleichter, III et al.

(10) Patent No.: US 6,682,494 B1
(45) Date of Patent: *Jan. 27, 2004

(54) MASSAGING SYSTEM HAVING ISOLATED VIBRATORS

(75) Inventors: Charles G. Sleichter, III, Dana Point, CA (US); Gayle B. Gerth, Dana Point, CA (US)

(73) Assignee: InSeat Solutions, LLC, Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/376,122

(22) Filed: Aug. 17, 1999

(51) Int. Cl.$^7$ .......................... A61H 1/00; A47C 17/00
(52) U.S. Cl. ............... 601/57; 601/70; 5/694; 297/217.3
(58) Field of Search ................. 601/49, 56–61, 601/65, 67, 70, 78, 86, 90, 92, 98; 5/694, 701, 740, 915, 933–935, 944; 297/217.3, 452.37

(56) References Cited

U.S. PATENT DOCUMENTS

| | | | |
|---|---|---|---|
| 4,326,506 A | | 4/1982 | Kawabata |
| 5,007,410 A | * | 4/1991 | DeLaney ................ 128/33 |
| 5,188,096 A | | 2/1993 | Yoo |
| 5,429,585 A | | 7/1995 | Liang |
| 5,437,608 A | | 8/1995 | Cutler |
| 5,462,515 A | | 10/1995 | Tseng |
| 5,713,832 A | | 2/1998 | Jain |
| 5,951,500 A | * | 9/1999 | Cutler ................ 601/47 |
| 6,053,880 A | * | 4/2000 | Sleichter, III ............ 601/57 |

\* cited by examiner

Primary Examiner—Nicholas D. Lucchesi
Assistant Examiner—Fenn Mathew
(74) Attorney, Agent, or Firm—Fulwider Patton Lee & Utecht, LLP

(57) ABSTRACT

A vehicle massaging system includes a seat pad and motorized vibrators in respective regions of the pad; and a controller for selectively activating the transducers. Each of the vibrators is in a cavity of a main cushion member, the cavity being closed by an outer cushion member that supports an occupant, a soft or resilient isolation device being interposed between the vibrator and the main cushion member for reduced coupling of vibrations to structure or other portions of the seat, but enhanced coupling to a target region of the outer cushion member for improved selectivity of particular regions of a user's body to be massaged, and in multiple seating installations, unwanted vibration of one seat is suppressed during activation of vibrators in an adjacent seat. The transducer is bonded to the outer cushion member or a reinforcing sheet that is laminated thereto, the isolation device contacting a bottom portion of the transducer. Alternatively, the isolation device can completely enclose the transducer. The isolation device can include a flexible sealed enclosure containing a viscous material. An offset plate portion of a housing of the vibrator can extend between a structural member of the seat and the target zone region, a body portion of the vibrator being laterally spaced from the structural member when the structural member would otherwise block desired placement of the vibrator. The heater element can be fire resistant. Also disclosed is a method for converting a padded support to produce isolated massaging, and a method utilizing a subassembly of vibrators and the outer cushion member to facilitate production of the system.

34 Claims, 6 Drawing Sheets

MASSAGING SYSTEM HAVING ISOLATED VIBRATORS

BACKGROUND

The present invention relates to massaging devices, and more particularly to massaging systems to be used in vehicles and other environments where radiated vibrations may be objectionable, such as in multiple seating structures and the like.

Typical massaging systems of the prior art include multiple vibrators that are imbedded in cushions or pads of beds, lounges, chairs and the like. See, for example, U.S. Pat. No. 5,188,096 to Yoo and U.S. Pat. No. 5,429,585 to Liang. It is also known to incorporate massaging vibrators in vehicle seats as disclosed in U.S. Pat. No. 5,462,515 to Tseng. A problem with these systems is that when there are multiple occupants, vibrators activated for the benefit of one occupant transmit significant and often objectionable vibrations to other occupants through shared padding and/or common structural elements. Although individual bucket seats are in common use by drivers and front seat passengers, they are less commonly provided for other passengers of automobiles and other vehicles. Accordingly, it has heretofore been impractical to provide bench seats of automobiles and passenger seats of aircraft with massaging systems.

Another problem is that users of massagers having pad-imbedded vibrators sometimes desire localized massaging only. However, the vibrations are transmitted with only gradual attenuation generally throughout the pad. Thus users are faced with the unwelcome choice of avoiding contact between the pad and particular body parts or putting up with unwanted vibrations.

A further problem is that internal structure of many seats interferes with a desired placement of vibration sources, rendering impractical desired patterns and modes of massaging.

It is also known to provide heating elements in combination with massaging devices of seats. However, existing heating elements of the prior art that are compatible with massaging can present objectionable fire hazards in some applications such as in aircraft seating.

Thus there is a need for a massaging system that overcomes the disadvantages of the prior art.

SUMMARY

The present invention provides a massaging system having localized massaging action. The motors are embedded in a padded user support, such as a vehicle seat, in a manner that avoids transmission of vibrations into structural members or non-local foam, and adjacent seating, if present. In one aspect of the invention, a massaging system for an occupant support structure includes a vibrator unit located in the support structure; a controller circuit for selectively powering the vibrator unit for selectively stimulating an occupant of the structure, the vibrator unit being in a cavity of a main cushion member, the cavity being closed by an outer cushion member that supports the occupant, a flexible isolation device being interposed between the vibrator unit and the main cushion member for isolating vibrations from the main cushion member. Preferably the isolation device comprises a viscous material for damping vibrations being radiated toward the main cushion member from the vibrator unit. The isolation device can incorporate the viscous material within a flexible sealed enclosure. Preferably the enclosure has an opening formed between opposite sides thereof for receiving a body portion of the vibrator unit. Alternatively, the isolation device can be formed of a material having a bulk or volumetric stiffness being less than corresponding stiffnesses of the main and outer cushion members.

A housing of the vibrator unit can have a generally cylindrical body portion and a plate portion, the plate portion facing the outer cushion member in generally parallel relation thereto. Preferably the plate portion is affixed to the outer cushion member for enhanced coupling of vibrations to the outer cushion member while maintaining the isolation from the main cushion member. The plate portion can project beyond opposite sides of the body portion. The plate portion can project beyond opposite ends of the body portion. A lower portion of the housing body portion can be circularly cylindrical, having an outside diameter D, the housing also having a depth approximately corresponding to the diameter D in a direction perpendicular to the plate portion.

The plate portion can have a length A and a width B, the cavity having a length L and a width W, the width W being between 0.2 inch and 0.5 inch greater than the width B, the length L being between 0.2 inch and 0.5 inch greater than the length A. The housing can have a depth E, the cavity having a height H, the height H being between 0.2 inch and 0.5 inch greater than the depth E. The length L can be approximately 3.75 inch, the width W being approximately 2.75 inch. The height H can be approximately 1.5 inch. Preferably the isolation device occupies at least 40 percent of an overall volume of the cavity for enhancing the effectiveness of the vibration isolation.

The apparatus can further include a reinforcing sheet member laminated between the main cushion member and the outer cushion member. The outer cushion member can be of substantially uniform thickness. The thickness of the outer cushion member can be between 0.18 inch and 0.4 inch. Preferably the thickness of the outer cushion member is approximately 0.25 inch.

Preferably the vibrator unit is one of a spaced plurality of vibrators that are located in plural zones of the structure for selectively stimulating particular tissue regions of the occupant, each vibrator being located in a corresponding counterpart of the cavity and having a corresponding isolation device interposed between the housing and the cavity. The outer cushion can cover each of the cavities. The main cushion and the outer cushion can form a seat pad of a seat. The massaging apparatus can be in combination with a back pad of the seat, the back pad having counterparts of the vibrators, the main cushion, the isolation devices, and the outer cushion. The seat can be one of a plurality of seats having a common structural element.

The apparatus can further include a heater unit attached to the outer cushion member and having a resistance wire connected between conductors of a fire resistant power cord and, secured between a pair of polyamide film sheet members, one side of each sheet member having a silicon base fire resistant adhesive coating, of the adhesive coating of one sheet member contacting the resistance wire and the other sheet member, the coating of the other sheet member securing the heater unit to the outer cushion member. Preferably the thickness of each sheet member is approximately 0.002 inch for providing sufficient structural integrity while effectively transmitting vibrations from the vibrator to a user having contact with the apparatus proximate the heater unit.

In another aspect of the invention, a vehicle seat includes a structural member and respective seat and back pads supported relative thereto, each pad a plurality of vibrator units, each vibrator unit having a housing, a motor supported within the housing, and means for connecting the motor to a source of electrical power, the motor being coupled to a mass element for producing vibratory motion of the housing; a main cushion member having a main supporting surface and having a plurality of spaced apart cavities formed therein and interrupting the supporting surface for receiving respective ones of the vibrator units, each cavity being sufficiently large to provide clearance space on all sides of the corresponding vibrator unit; a plurality of isolation devices in respective ones of the cavities; and an outer cushion member with the vibrators bonded thereto and projecting into respective cavities of the main cushion member, the outer cushion member being also bonded to the main supporting surface and covering the cavities with each isolation device contacting a bottom portion of a vibrator unit and being interposed between the vibrator unit and the main cushion member for coupling vibrations mainly into the outer cushion member, the outer cushion member forming an outer supporting surface being spaced from the main supporting surface. The massaging apparatus can further include a controller electrically connected to each of the vibrators for activating selected ones of the vibrators. Each of the isolation devices can include the flexible sealed enclosure having a viscous material contained therein.

In another aspect of the invention, a seat includes a structural member, a pad supported relative to the structural member with the structural member extending behind a target region zone of an occupant supporting surface of the pad; a vibrator unit having a housing including a projecting plate portion, a motor supported within the housing, means for connecting the motor to a source of electrical power, the motor being coupled to a mass element for producing vibratory motion of the housing, the vibrator unit being supported by the pad with the plate portion extending between the structural member and the target region zone for imparting vibrations to the occupant supporting surface opposite the structural member, the body portion of the housing projecting away from the occupant supporting surface at one side of the structural member.

In another aspect of the invention, a massaging apparatus includes a vibrator unit having a housing including a body portion and a plate portion that projects from one side by a distance greater than a width of the body portion, a main cushion member having a main supporting surface and being formed of a resilient material, a cavity interrupting the supporting surface being formed therein; a structure supporting the main cushion member with a structural member extending parallel to the main supporting surface for modifying its contour; and an outer cushion member bonded to the main supporting surface and covering the cavity, the outer cushion member forming the outer supporting surface spaced from the main supporting surface, the cushion members a seat pad of a seat that also includes a structural member extending within the pad in relatively closely spaced relation to a target zone region of the outer supporting surface, the vibrator being located within the cavity with the plate portion of the housing facing a target zone region of the outer cushion member in generally parallel relation thereto, the plate portion projecting between the structural member and the outer cushion member for imparting vibrations through the outer cushion member opposite the structural member, the body portion of the housing projecting away from the outer cushion member at one side of the structural member. The cavity can be configured to provide clearance space on all sides of the vibrator unit, the apparatus further including the isolation device contacting the vibrator and being interposed between the vibrator and the main cushion member.

In a further aspect of the invention, a method for converting a padded support device having a resilient main cushion to produce isolated massaging of a user's body includes:

(a) providing a vibratory transducer having a housing and a control cable extending from the housing for driving the transducer;

(b) forming a cavity in a supporting surface of the main cushion, the cavity being sufficiently large for receiving the transducer housing in spaced relation to the main cushion;

(c) placing the transducer housing in the cavity;

(d) positioning the control cable to extend from the cavity and on the supporting surface to an edge margin thereof;

(e) interposing a resilient isolation device between the transducer housing and the main cushion member with a portion of the housing contacting and projecting into the isolation device;

(f) providing a resilient pad member for covering the supporting surface;

(g) bonding a reinforcing sheet member to a bottom surface of the pad member; and (h) bonding the sheet member to the supporting surface, the sheet member being laminated between the main cushion and the pad member and covering the cavity.

The step of enclosing can include completely. enclosing the transducer housing with the isolation material, the isolation material preferably having a volume of not less than 40 percent of a volume of the cavity. Alternatively, the placing and enclosing includes fastening the transducer onto the sheet member in fixed relation to the pad member prior to bonding the sheet member to the supporting surface. Further, there be a plurality of the transducers, the forming being of a corresponding plurality of spaced apart cavities, and the fastening including spacing the transducer on the sheet member in correspondence with the spacing of the cavities.

DRAWINGS

These and other features, aspects, and advantages of the present invention will become better understood with reference to the following description, appended claims, and accompanying drawings, where:

DESCRIPTION

Figure 1:
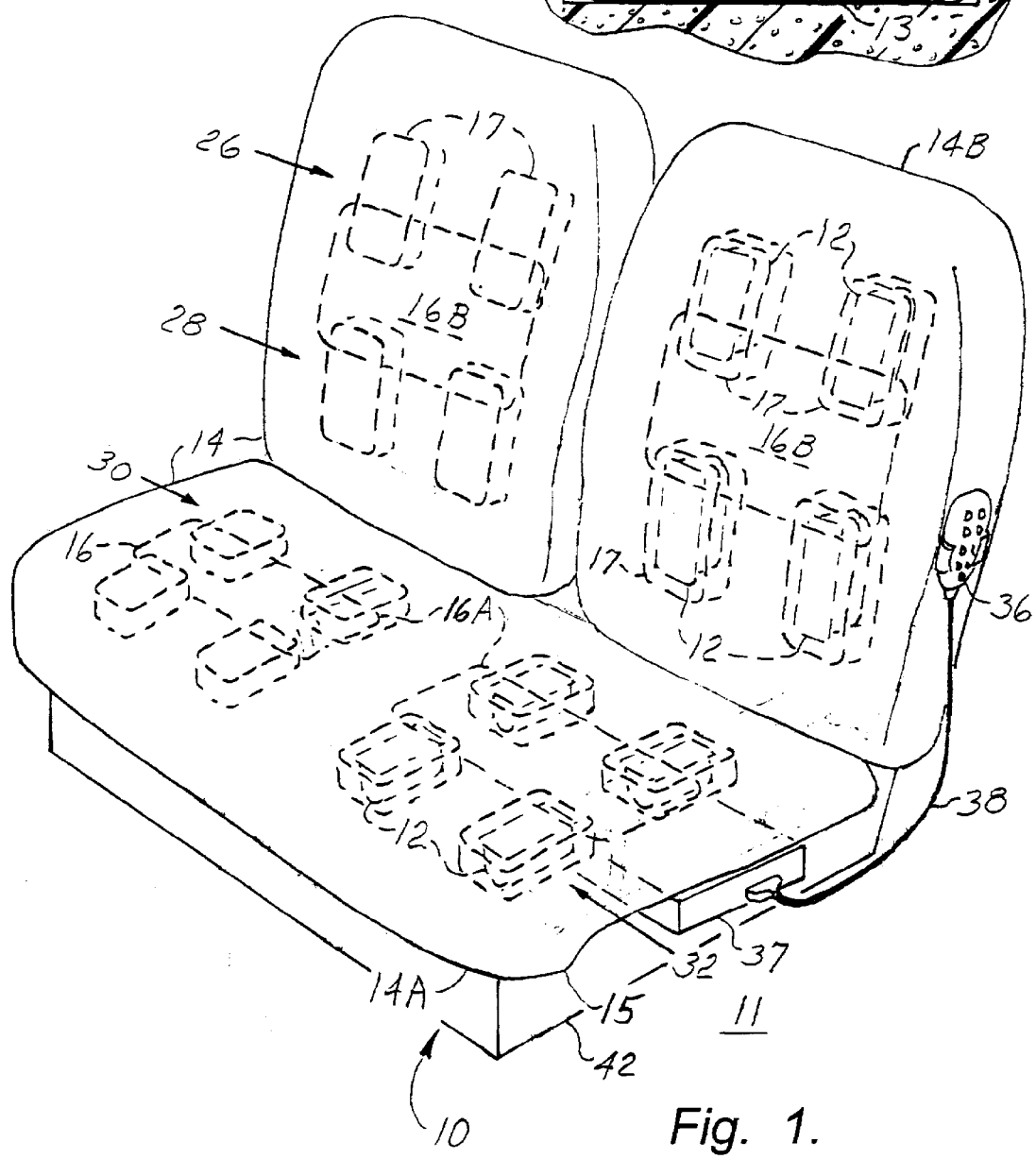
FIG. 1 is a perspective view of a dual vehicle seat unit incorporating a massaging system according to the present invention.

The present invention is directed to a massaging system that is particularly effective in selectively massaging local muscle groups of a user, while limiting transmission of vibrations to adjacent seating and structure. With reference to FIGS. 1–4 of the drawings, the present invention comprises a microcontroller based massaging system 10 that is installed in equipment such as a vehicle, a vehicle floor being designated 11 in FIG. 1. The system 10 has a plurality of vibrators 12 that are embedded in a massage pad 14 which can form a portion of a seat 15. FIG. 1 shows separate counterparts of the system 10 in a side-by-side pair of seats 15, the seats 15 being structurally joined as further described below. In the exemplary seat 15, there is a seat cushion 14A and a separate back cushion 14B. The system 10 may also contain embedded heaters 16 such as a seat heater 16A and a back heater 16B for enhanced massaging of the user. Each vibrator 12 has a housing 13 being further described below, and may comprise a conventional combination of a small DC motor that rotates an eccentric weight, or if desired, a pair of eccentrics at opposite ends of the motor, the vibrators 12 being sometimes referred to herein as motors. It will be understood that other forms of vibrators may be used. Also, the massage pad 14 can be a separate device that is not integrated with the seat 15. The pad 14 may be divided into foldable sections such as an upper section being the back pad 14B (for supporting the upper and lower back of the user), and a lower section being the seat pad 14A (for supporting the user's hips and thighs). It will be understood that the pad 14 can also include a further section for stimulation and/or massaging of the user's calves.

Figure 3:
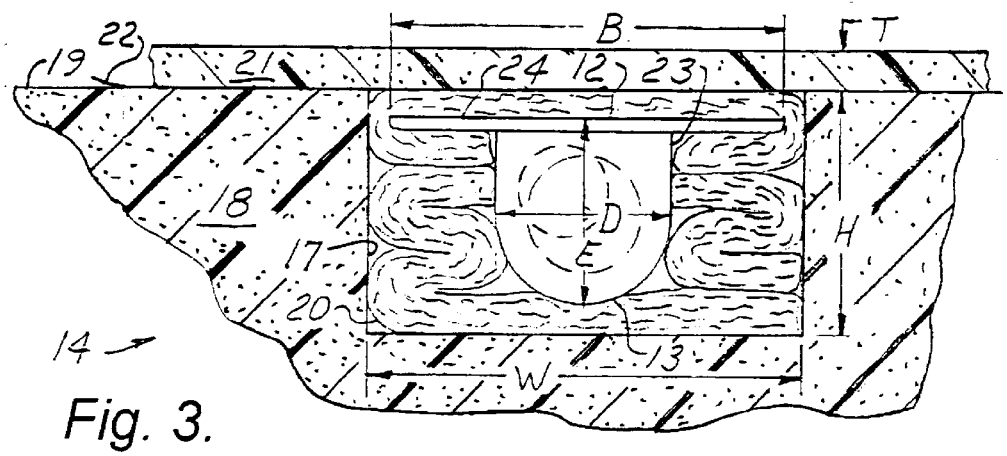
FIG. 3 is a sectional view of the cushion portion of FIG. 2.

According to the present invention, each of the vibrators 12 is located in a cavity 17 that is formed in a main cushion member 18 of the seat 15, an isolation device 20 being interposed between the housing 13 and the cushion member 18 for suppressing the coupling of vibrations of the housing 13 to the cushion 18. The cavity 17 interrupts a main supporting surface 19 of the cushion 18. An outer cushion member 21 is bonded to the main supporting surface 19, thereby enclosing respective ones of the vibrators 12 and the isolation devices 20 in the cavities 17. Preferably a flexible reinforcing sheet member 22 is laminated between the main cushion member 18 and the outer cushion member 21, the sheet member 22 also covering the cavities 17. Preferably, the housing 13 is formed for enhanced coupling of vibrations into the outer cushion member 21 relative to the suppressed coupling to the main cushion member 18. Accordingly, each housing 13 is formed (such as by molding) with a generally cylindrical body portion 23 and a generally planar plate portion 24, the housing 13 being oriented[]with the plate portion 23 facing the outer cushion member 21 in parallel relation thereto. As shown in FIG. 3, the plate portion 24 projects beyond opposite sides of the body portion 23 for presenting an enhanced surface area of the plate portion in close proximity to the outer cushion member 21, a lower portion of the body portion being circularly cylindrical for limited area proximity of the housing 13 with the main cushion member 18. It will be understood that the enhanced coupling by the plate portion 24 is obtained when the plate portion projects beyond at least one side of the body portion 23.

Figure 2:
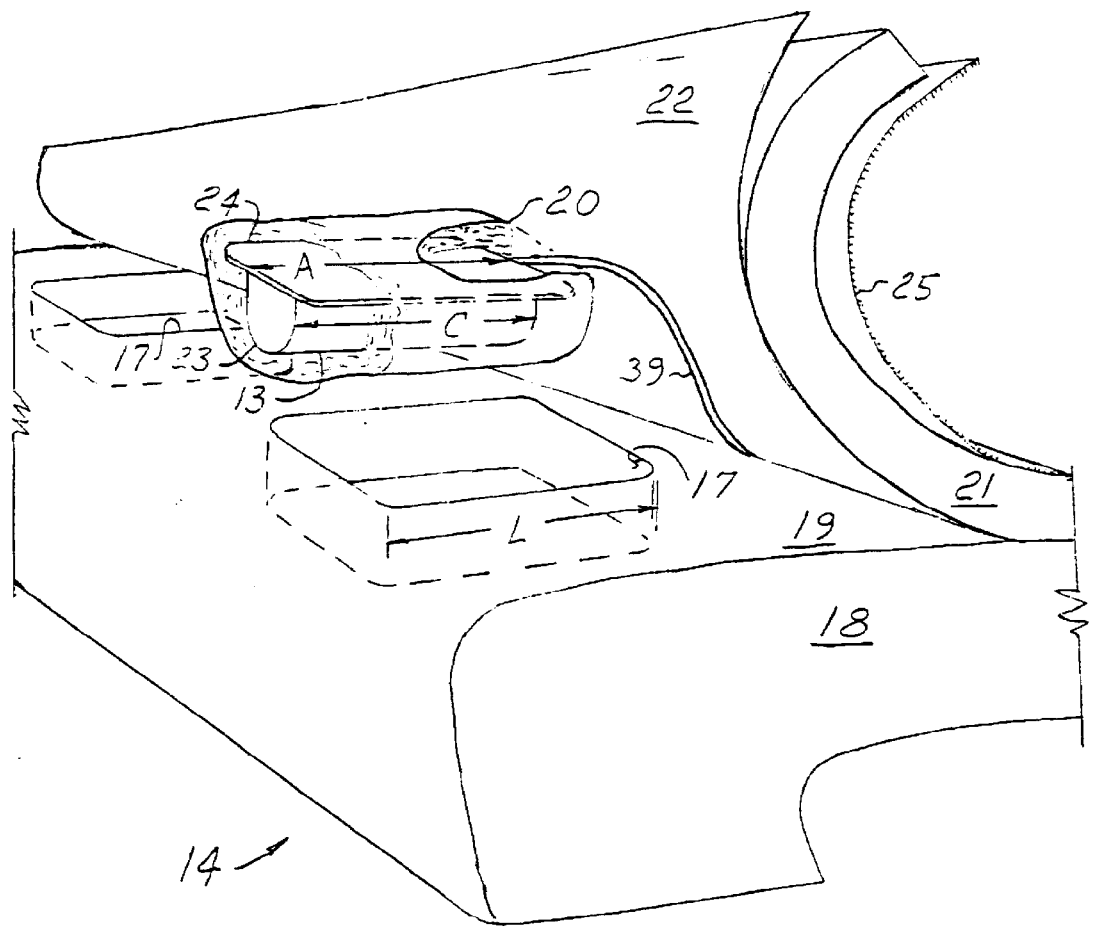
FIG. 2 is an enlarged partially exploded perspective view of a cushion portion of the system of FIG. 1.

The plate portion 24 can also project beyond opposite ends of the body portion 23 as further shown in FIG. 1. More particularly, each housing 13 has a length A and a width B of the plate portion, the body portion having a length C and a width corresponding to a diameter D of the bottom portion, the housing 13 also having a depth E approximately corresponding to the diameter D. The cavity 17 has a length L that exceeds the length A by a distance that is sufficient for accommodating layers of the isolation device 20 at opposite ends of the housing 13, that distance being preferably between 0.2 inch and 0.5 inch. Also, the cavity 17 has a width W that exceeds the width B by a corresponding distance, and a depth or height H that exceeds the depth E by a distance that is also preferably between 0.2 inch and 0.5 inch. In an exemplary configuration of the system 10, the approximate dimensions of the housing 13 are A=3.5 inches, B=2.5 inches, C=2.0 inches, D=1.15 inches, and E=1.19 inches; the approximate dimensions of the cavity 17 being L=3.75 inches, W=2.75 inches, and H=1.5 inches. Corner extremities of the cavity 17 are rounded, having a corner radius which can be approximately 0.4 inch, the plate portion 24 of the housing 13 correspondingly having a corner radius (which can be approximately 0.2 inch) as shown in FIG. 2 for maintaining clearance between the vibrator 12 and the main cushion member 18. Preferably, the isolation device 20 occupies at least 40 percent of the volume of each cavity 17. As further shown in FIGS. 2 and 3, a portion of the isolation device 20 extends between the plate portion 24 and the outer cushion member 21 (and the sheet member 22).

Suitable materials for the main cushion member 18 and the outer cushion member 21 include conventional closed-cell foam padding such as 2-pound mini-cell polyethylene, the outer cushion member 21 preferably having a uniform thickness T that can be approximately 0.25 inch. Thus the massage pad 14 has a foam core including the cushion members 18 and 21. Typically the main cushion member 18 has a thickness on the order of 2 or 2.5 inches. Each massage pad 14 also typically has an outer flexible seat cover 25 as shown in FIG. 2, which can be made from a decorative material such as sheepskin fur. A suitable material for the isolation device 20 is Nomex™ batting fiber, available from Skandia of Rockford, Ill. A suitable material for the sheet member 22 is needle punch polyester Style #330, 8 oz. denier fiber, available from Lily Designs of Glendale, Calif. The material of the isolation device 20, in a free thickness of approximately 0.5 inch, is wrapped at least partially about each vibrator 12. In the exemplary configuration of FIGS. 1–3, the isolation device 20 completely surrounds the housing 13, being accordion-folded in regions of the cavity 17 beneath the outwardly projecting portions of the plate portion 24. As further shown in FIG. 3, the isolation member 20 can be formed of separate pieces, one being placed into the cavity 17 prior to insertion of the vibrator 12, the other being wrapped over upper and lower surfaces of the plate portion 24. The sheet member 22 is first bonded to the outer cushion member 21 by a suitable adhesive such as a spray foam adhesive and, after the vibrators 12 and the isolation devices 20 are in place, the combination of the members 21 and 22 is bonded to the supporting surface 19 of the main cushion member 18 by a further quantity of the adhesive. A suitable spray adhesive is Super 77™ Spray Adhesive, available from Minnesota Mining and Manufacturing Corp. of St. Paul, Minn. When a pad 14 is provided with a heater 16, the heater is bonded to the outer cushion member 21 opposite the sheet member 22, being covered by the seat cover 25, which can also be bonded to the cushion member 21 and the heater 16.

Figure 3A:
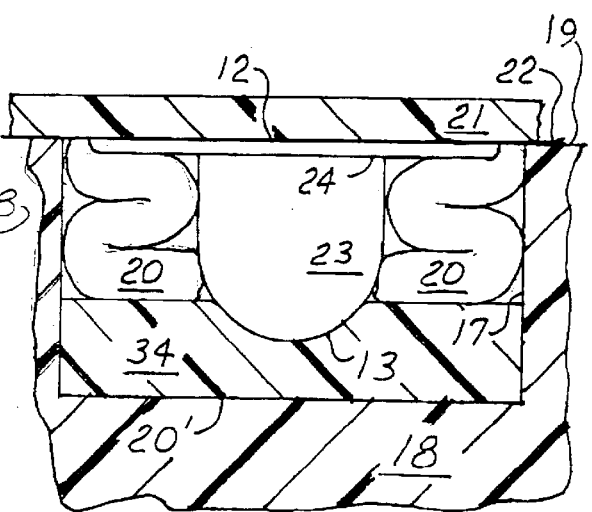
FIG. 3A is a sectional view as in FIG. 3, showing a preferred alternative configuration of the cushion portion of FIG. 2.

With further reference to FIG. 3A, the plate portion 24 of each vibrator housing 13 can be bonded directly to the sheet member 22 instead of having the isolation device 20 interposed therebetween. In this configuration, there is significantly greater coupling of vibrations into the outer cushion member 21 without greatly increased coupling to the main cushion member 18. Also, the bonding of plural vibrators 12 to the outer cushion member 21 (and the sheet member 22) provides an inexpensive way to produce a subassembly that greatly facilitates fabrication of the massaging system 10 in many applications. Thus a preferred method for fabricating the massage pad 14 includes forming the main cushion member 18 with a spaced plurality of the cavities 17 in the main supporting surface, bonding the vibrators 12 to the outer cushion member 21 with spacing corresponding to the spacing of the cavities 17, inserting the isolation devices 20 into the cavities 17, and bonding the outer cushion member to the supporting surface 19 of the main cushion member 18. Thus the vibrators 12 and the outer cushion member 21 can be provided as inexpensive subassemblies (with the sheet member 22 and/or the heater 16) for use in retrofitting existing seating with the system 10 as described below as well as for facilitating production of new equipment as described above.

As further shown in FIG. 3A, an alternative and preferred configuration of the isolation device, designated 20', has counterparts of the previously described fibrous device 20 (FIG. 3) confined below the plate portion 24, the housing 13 directly contacting the sheet member 22, and a separate foam member, designated conformal pad 34, filling a bottom portion of the cavity 17. The pad 34 contacts and conforms to the shape of the bottom portion of the housing bottom portion 23. A suitable material for the conformal pad 34 is available as No. CF-40 Confor Foam from Skandia.

In the exemplary configuration shown in FIG. 1, the pads 14 collectively have eight vibrators 12 arranged in groups of two motors in four zones, as follows: (1) a first zone 26 for the left and right sides of the shoulder area; a second zone 28 for the left and right sides of the lower back; a third zone 30 for the left and right hips; and a fourth zone 32 for the left and right thighs. Typically, the seat heater 16A is centrally located between the hip and thigh areas 30 and 32, and the back heater 16B is centrally located in or between the shoulder and lower back areas 26 and 28. It will be understood that other groupings and numbers of zones are contemplated.

Figure 4:
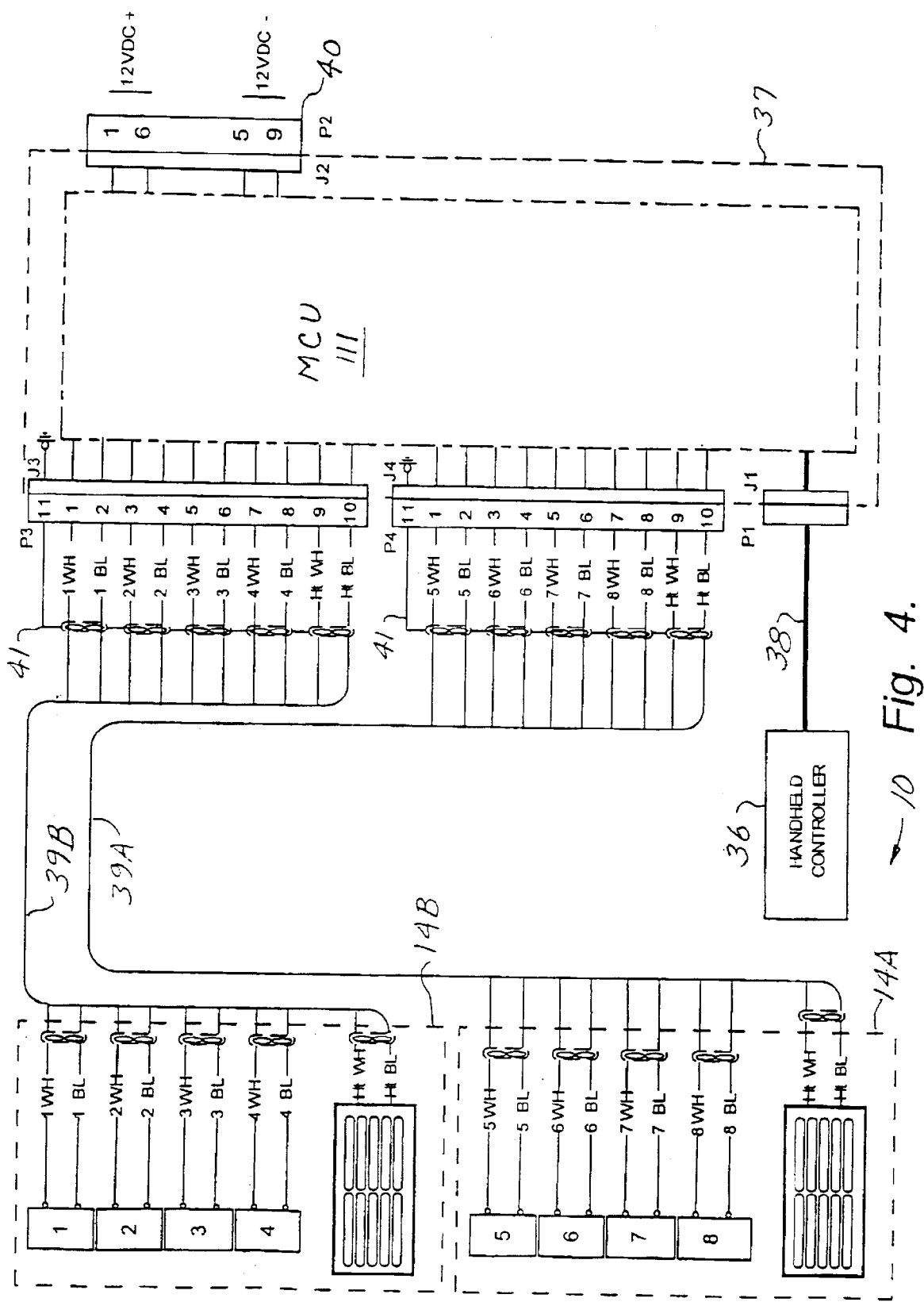
FIG. 4 is a wiring diagram of the system of FIG. 1.

The system 10 is activated via a remote control device or wand 36 containing push buttons or keys and visual status indicators, as more fully described in copending U.S. patent application Ser. No. 09/081,402 that was filed on May 18, 1998, and which is incorporated herein by this reference. The wand 36 is removably coupled to an electronics module 37 via a cable 38, the module 37 having a programmed microcontroller (MCU) 111 for driving the vibrators 12 and heaters 16 as described in the above-referenced patent application. In an exemplary implementation, the electronics module 37 is mounted under the seat pad 14A, being electrically connected to the vibrators 12 and the heaters 16 by separate wiring harnesses 39, designated seat harness 39A and back harness 39B as indicated in FIG. 4, wiring to the individual vibrators 12 (and the heaters 16) passing between the main cushion member 18 and the sheet member 22 into respective ones of the cavities 17 as shown in FIG. 3. Alternatively, passages can be cut into the main cushion member 18 for passing conductors of the harness 39. Similarly, a thermostat of the heater 16 can be imbedded in the main cushion member 18. The wand 36 and the massage pad 14 are powered through a power cable 40 from a suitable source such as DC power of the vehicle 11. In applications wherein electromagnetic interference is a factor (such as the vehicle 11 being an aircraft), the harnesses 39 are provided with grounded shielding as indicated at 41, and the vibrators 12 can be provided with suitable bypass capacitors. It will be understood that suitable batteries for operating the system 10 can be located within the pad 14 or the electronics module 37. The control wand 36 provides a variety of functions or modes which are performed through the manipulation of buttons, keys or equivalent means, with corresponding indicators that designate selected functions and modes as further described in the above-referenced copending patent application. It will be understood that some or all of the control functions of the MCU 111 can be incorporated in the wand 36. Further, the wand 36 can built into an arm of the seat 15 instead of being a hand-held unit as shown in FIG. 1.

Thus each vibrator 12 is caused to vibrate as the eccentric weight rotates, thereby deforming primarily selected regions of the outer pad member 21 and coupling the vibrations for stimulating and/or massaging muscle tissue of the user.

As further described in the referenced copending application, power is turned on or off by a "PWR" button on the wand 36, the PWR button also acting as a double action key for selecting massage duration, and optionally entering test and demonstration modes. The four zones 26–32 are individually actuable by pressing corresponding buttons, with visual status indications being provided by respective lights disposed adjacent the buttons. Other buttons control the heaters 16 and various modes of operation of the vibrators 12, such as select, wave, pulse and zig-zag massaging modes. Additional buttons can control intensity and the speed of progression of the various modes. Additional optional features and modes are described in commonly owned copending application Ser. No. 09/071,357, entitled Microcontroller Based Massage System, that was filed on Apr. 28, 1998, being incorporated herein by this reference.

As further shown in FIG. 1, the side-by-side pair of seats 15 have a structural support in the form of a leg frame 42 that is shared between adjacent ones of the seats 15, additional structure (not shown) connecting the frame 42 beneath and/or within the massage pads 14. Typically, the frame 42 is suitably secured to the vehicle floor 11, and may incorporate a positioning mechanism (not shown).

Figure 5:
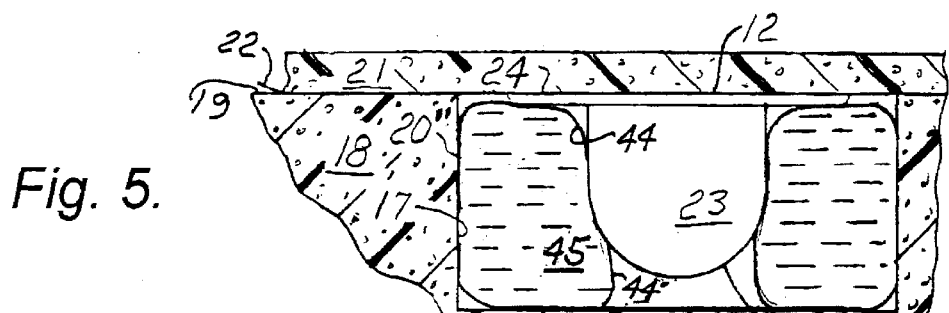
FIG. 5 is a sectional view as in FIG. 3, showing an alternative configuration of the cushion portion of FIG. 2.

With further reference to FIG. 5, a more preferred configuration of the isolation device, designated 20", provides fluidic viscous damping of vibrations within the cavity 17 opposite the vibrator 12 from the outer cushion member 21. More particularly, the device 20' includes a bag or envelope member 44 sealingly enclosing a highly viscous gel material 45. The envelope member 44 can be a conventional polymer bag having a sealable opening. A particularly preferred configuration of the envelope member 45 is generally torroidal, having a central opening 44' into which the body portion 23 of the vibrator 12 projects. A suitable source of the gel material 45 is commercially available as minicylinder pad filler formula #9001-01 from Gar Labs of Riverside, Calif.

Figure 6:
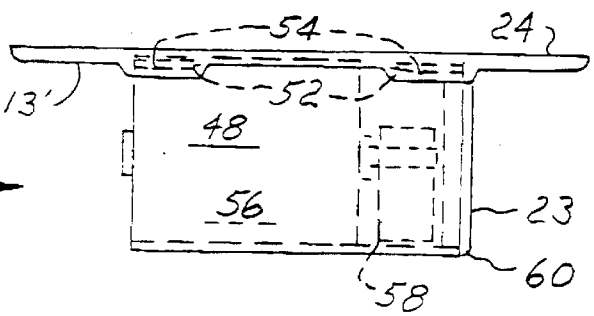
FIG. 6 is a side view showing an alternative configuration of a vibrator portion of the system of FIG. 1.
Figure 7:
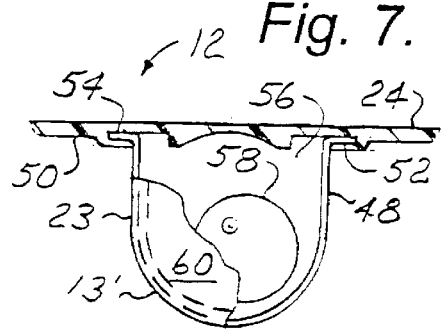
FIG. 7 is a fragmentary sectional end view of the vibrator portion of FIG. 6.

With further reference to FIGS. 6 and 7, each vibrator 12 can have a counterpart of the housing, designated 13', wherein the body portion 23 is formed by a U-shaped sheet metal holder 48, the plate portion 24 being formed by a molded plate member 50, outwardly projecting tab portions 52 of the holder 48 engaging respective pockets 54 that are formed in the plate member 50. A motor 56 having an eccentric mass 58 is retained between the holder 48 and the plate 50, the housing 13' further including a cap member 60 for insuring that fibers of the isolation member 20 are prevented from coming into contact with the eccentric mass 58.

Figure 9:
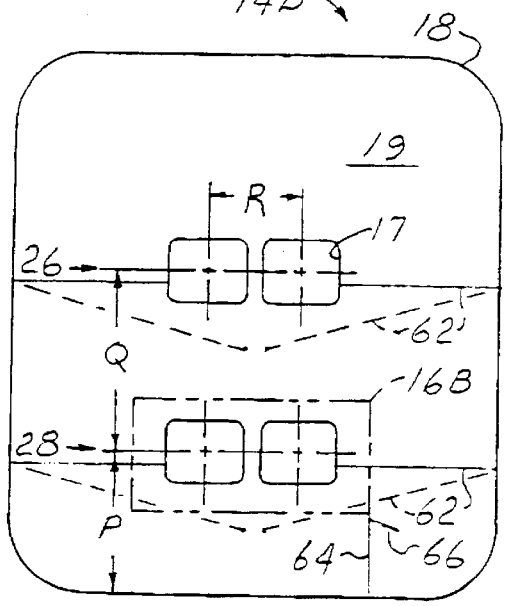
FIG. 9 is an elevational view showing an alternative configuration of a back cushion portion of the system of FIG. 1.
Figure 8:
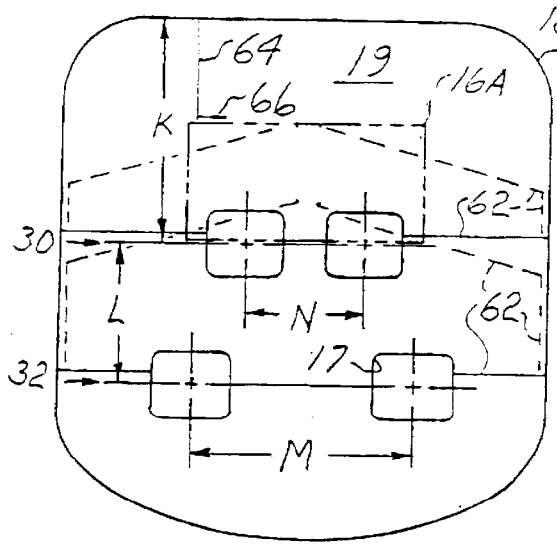
FIG. 8 is a plan view showing an alternative configuration of a seat portion of the system of FIG. 1.

With further reference to FIGS. 8 and 9, an alternative configuration of the massaging system 10 has provisions for wiring to the vibrators 12 passing laterally from the cavities 17 and around side extremities of the main cushion members 18 to locations opposite the supporting surfaces 19. For this purpose, a passage or slot 62 is cut from each cavity 17 to a depth of approximately 0.5 inch for receiving respective pairs of conductors of the corresponding wiring harness 39. The conductors are dressed into the slots 62, which are then sealed shut using a suitable adhesive, such as the above-identified spray adhesive.

FIGS. 8 and 9 also show an exemplary and preferred arrangement of the cavities 17 in the seat pad 14A and the back cushion 14B. Particularly regarding the seat cushion 14A, one pair of the cavities 17 (for the hips zone, 30) is centered at a distance K from a rear extremity of the pad 14A, another pair of the cavities (for the thighs zone 32) being spaced forwardly a distance L beyond the distance K as shown in FIG. 8. The cavities 17 for the thighs zone 32 are laterally spaced laterally by a center distance M, the cavities 17 for the hips zone 30 being spaced laterally by a distance N that is preferably less than the distance M. Also regarding the back cushion 14B, one pair of the cavities 17 (for the lower back zone 28) is centered at a distance P from a bottom extremity of the pad 14B, another pair of the cavities (for the upper back zone 32) being spaced upwardly a distance Q beyond the distance P as shown in FIG. 9. The cavities 17 for the upper and lower back zones 26 and 28 are laterally spaced laterally by a center distance R. In the preferred arrangement, the distances are approximately K=9.5 inches, L=6 inches, M=9.5 inches, N=5 inches, P=7.5 inches, Q=6.5 inches, and R=4 inches.

Preferred locations for the heaters 16A and 16B (when present) are further indicated by broken lines in FIGS. 8 and 9. More particularly, the heater 16A is laterally centered within the distance K and partially covering the cavities 17 for the hips zone 30 as shown in FIG. 8. The heater 16A is laterally centered within the distance K and partially covering the cavities 17 for the hips zone 30 as shown in FIG. 8. The heater 16B is laterally centered in the lumbar area, covering the cavities 17 of the lower back zone 28. Counterparts of the slots 62 can be cut into the combination of the main and outer cushion member as indicated at 64 for receiving conductors of the harnesses 39 being connected to the heaters 16. Typically, each heater 16 has a thermostat element 72 wired thereto, a short slit opening having a depth of approximately 1 inch being cut through the outer cushion member 21 for receiving the thermostat element 72. The slit and the slot 64 for each of the heaters 16 (if present) are also adhesively sealed as described above once the wiring is in place.

Figure 10:
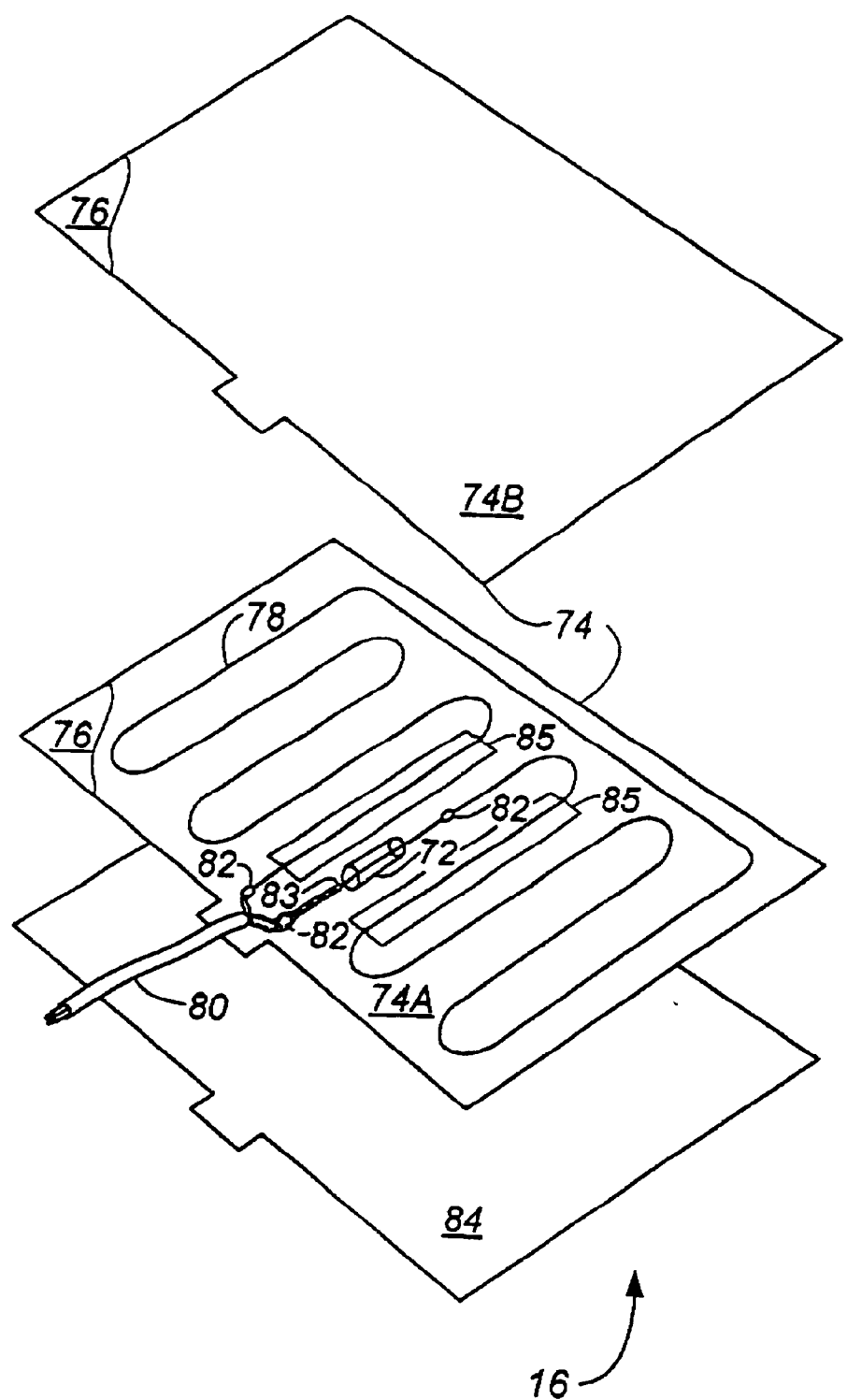
FIG. 10 is an enlarged partially exploded perspective view of a heater of the present invention.

With further reference to FIG. 10, a preferred configuration of the heaters 16 that provides exemplary fire resistance without excessively interfering with massaging action includes a pair of sheet members 74 having an adhesive film coating 76 on one side thereof, and a nominally planar assembly of a resistance wire 78 and the thermostat element 72 that is adhesively sandwiched between the sheet members 74. A suitable material for the sheet members 74 is a bum-resistant polyamide film, one such material being available as bum resistant Kapton® from DuPont of Wimington, Del. and having a burn resistant silicone-based contact cement coated on one side thereof. Electrical power for each heater 16 is delivered through a two-conductor electrical cable 80 that enters between the sheet members 74, being connected, respectively to the resistance wire 76 and the (series-connected) thermostat element 72 by crimped connections 82, an additional crimped connection 82 being made at the previously described series connection between the wire 76 and the thermostat element 78. The connection 82 between the thermostat element 72 and the cable 80 is covered by length of shrink tubing 83, A first one of the sheet members, designated 74A, has its adhesive coating facing away from the sandwiched wiring and temporarily having a release film 84 thereon, the film 84 being removed just prior to bonding to the outer cushion member 21. The other sheet member, designated 74B, has its adhesive coating facing inwardly for bonding to the wiring and the first sheet member 74A. Also shown in FIG. 10 are lengths of adhesive Kapton® tape 85 for holding the wire 78 onto the first sheet member 74A and restraining movement of the wire 78. A suitable cable for the electrical cable 80 having burn resistant insulation is available according to MIL-W-227500-20TE 2U00 from A. E. Petshe, of Costa Mesa, Calif. Alternatively, suitable soldered connections may be substituted for the crimped connections 82. Preferably each of the sheet members 74 has a thickness of approximately 0.002 inch for providing sufficient structural integrity while effectively transmitting vibrations from the vibrator 12 to an occupant of the seat 15.

The system 10 of the present invention is also applicable to existing seating as described herein. A method for converting a padded support device to produce isolated massaging of a user's body includes steps of:

1. Removing an outer cover of the device if present for exposing a main cushion thereof;
2. Providing a counterpart of the transducer 12 having conductors of the harness 39 extending therefrom;
3. Forming a counterpart of the cavity 17 in the main cushion, the cavity interrupting a user-supporting surface of the cushion and being sufficiently large for receiving the combination of the transducer 12 and the isolation device 20;
5. Providing the isolation device 20;
4. Placing the transducer together with the isolation device 20 in the cavity 17;
6. Positioning the harness to extend from the cavity to an edge margin of the cushion;
7. Providing a counterpart of the outer cushion member 21 for covering the supporting surface;
8. Bonding a counterpart of the reinforcing sheet member 22 to a bottom surface of the outer cushion member; and
9. Bonding the sheet member to the supporting surface with the housing mechanically coupled to the outer cushion member, the sheet member being laminated between the main cushion and the outer cushion member and covering the cavity 17.

Figure 12:
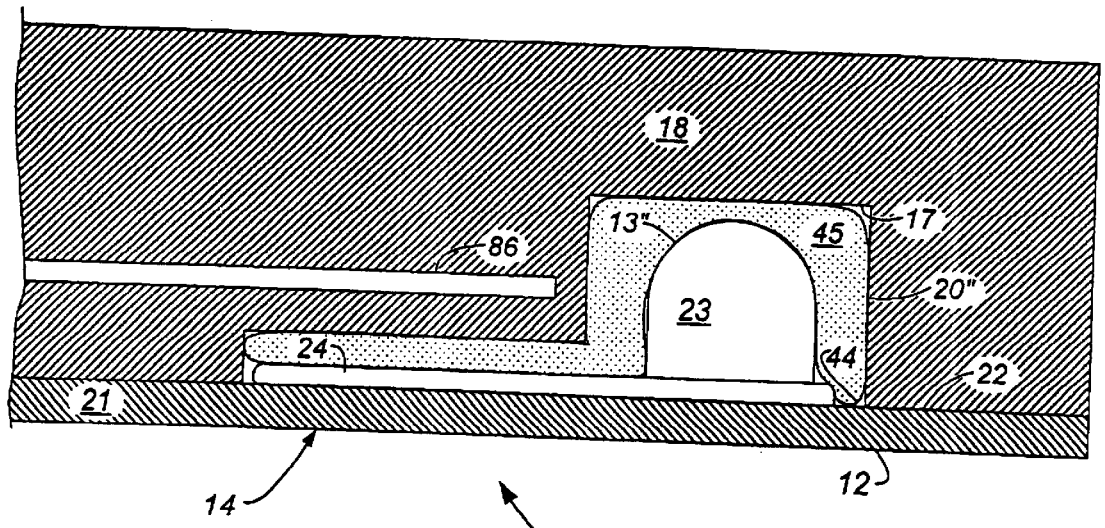
FIG. 12 is a sectional view showing an alternative configuration of the cushion portion of the system of the present invention.
Figure 11:
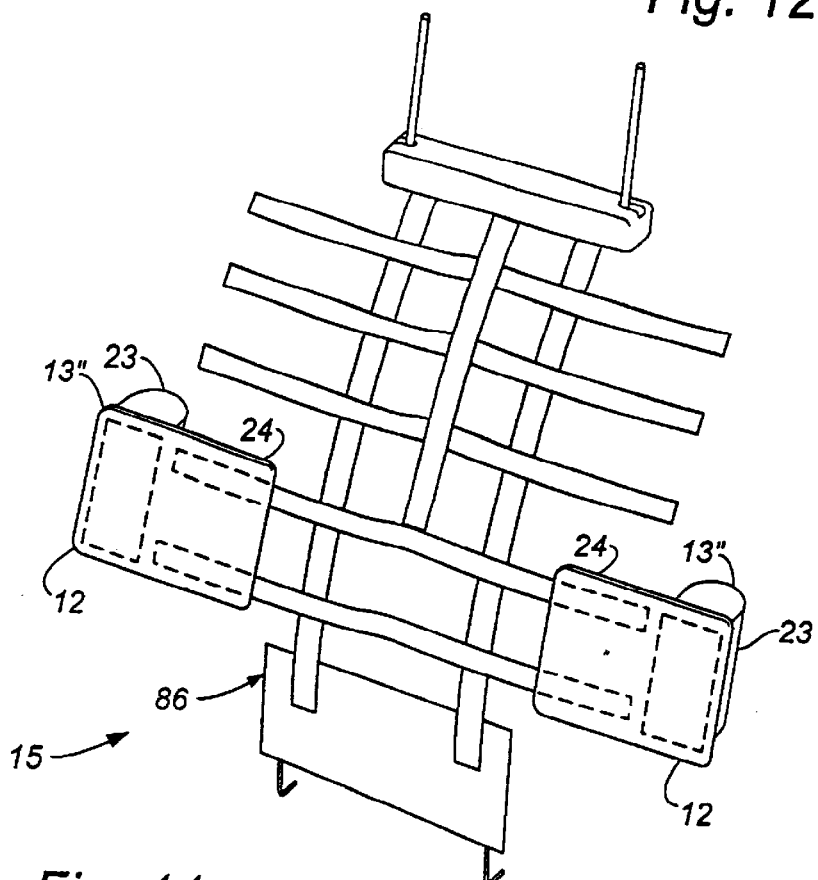
FIG. 11 is a perspective view of an alternative configuration of a seat portion having a motorized structure in the system of the present invention.

With further reference to FIGS. 11 and 12, another alternative configuration of the vibrator housing, designated 13", has the plate portion 24 enlarged and offset to one side of the body portion 23 for permitting effective massaging in regions of the seat 15 having structure thereof that would block proper placement of the vibrators 12 of FIGS. 3 and 5–7. As shown in FIG. 11, the seat 15 can include a motorized structure 86 for modifying a contour of the massage pad 14, such structure being commercially available as a Model "N" 4-way electrical lumbar unit from Schukra Division of Legget and Platt Company located in Ontario, Canada. In typical installations, the structure 86 extends sufficiently close to the front of the pad 14 to preclude location of the previously described vibrators 12 therebetween. When it is desired to provide effective massaging action in a target region of the seat 15 having such structure, the vibrator 12 for that location is configured with the housing 13", the plate portion 24 thereof extending between the outer cushion 21 and the structure 86, the body portion 23 being displaced laterally relative to the plate portion 24 for clearing the structure 86. Optionally, the pad 14 can include counterparts of the main cushion member 18 with the cavity 17 formed therein, and the outer cushion 21, the cavity 17 having an offset configuration for accommodating the offset housing 13" and a counterpart of the isolation device 20" of FIG. 5 as shown in FIG. 12. It will be understood that the envelope member 44 can be formed with the preferred opening 44' of FIG. 5, not shown in FIG. 12.

Thus it is believed that the system 10 of the present invention is effective for both improving the selectivity of massaging action as well as for preventing unwanted vibrations being conducted into adjacent seating or other structure.

Although the present invention has been described in considerable detail with reference to certain preferred versions thereof, other versions are possible. For example, the sheet member 22 is not required to completely cover the supportive surface 19. Instead, the sheet member can be sufficiently large to extend some distance beyond opposite sides of the cavities 17 of the corresponding massage pad 14; alternatively, smaller pieces of the material can be used to cover pairs of the cavities or, if the cavities are sufficiently spaced, single pieces of the sheet material can be bonded over individual ones of the cavities 17. Also, one or both of the heaters 16 can be bonded to the sheet member 22, either in facing relation to the main cushion member 18 or to the outer cushion member 21, prior to the bonding to the supporting surface 19. Moreover, the heater 16 can serve as a reinforcing closure of at least some of the cavities 17, replacing some or all of the sheet member 22. Therefore, the spirit and scope of the appended claims should not necessarily be limited to the description of the preferred versions contained herein.

What is claimed is:

1. A massaging apparatus comprising:
   (a) a vibrator unit including a housing, a motor supported within the housing, means for connecting the motor to a source of electrical power, the motor being coupled to a mass element for producing vibratory motion of the housing;
   (b) a main cushion member having a maim supporting surface and being formed of a resilient material having a first volumetric stiffness, a cavity being formed therein and interrupting the supporting surface for receiving the vibrator unit, the cavity being sufficiently large to provide clearance space on all sides of the vibrator unit;
   (c) an isolation device having, a second volumetric stiffness contacting at least a portion of the vibrator unit, the isolation device further contacting at least a portion of the main cushion member, wherein the isolation device is interposed between the vibrator unit and the main cushion member; and
   (d) an outer cushion member having a third volumetric stiffness being greater than the second volumetric stiffness, the outer cushion member being bonded to the main supporting surface and covering the cavity, the outer cushion member forming an outer supporting surface being spaced from the main supporting surface.

2. The massaging apparatus of claim 1, wherein the isolation device comprises a viscous material for damping vibrations being radiated toward the main cushion member from the vibrator unit.

3. The massaging apparatus of claim 2, wherein the isolation device incorporates the viscous material within a flexible sealed enclosure.

4. The massaging apparatus of claim 3, wherein the flexible sealed enclosure is formed having an opening between opposite sides thereof for receiving a body portion of the vibrator unit.

5. The massaging apparatus of claim 1, wherein the isolation device has a volumetric stiffness being less than respective volumetric stiffness characteristics of the main and outer cushion members.

6. The massaging apparatus of claim 1, wherein the vibrator housing has a generally cylindrical body portion and a plate portion, the plate portion facing the outer cushion member in generally parallel relation thereto.

7. The massaging apparatus of claim 6, wherein the plate portion of the housing is fixedly connected to the outer cushion member.

8. The massaging apparatus of claim 6, wherein the plate portion projects beyond opposite sides of the body portion.

9. The massaging apparatus of claim 8, wherein the plate portion projects beyond opposite ends of the body portion.

10. The massaging apparatus of claim 6, wherein a lower portion of the housing body portion is circularly cylindrical, having an outside diameter D, the housing also having a depth approximately corresponding to the diameter D in a direction perpendicular to the plate portion.

11. The massaging apparatus of claim 6, wherein the plate portion has a length A and a width B, and the cavity has a length L and a width W, the width W being between 0.2 inch and 0.5 inch greater than the width B, the length L being between 0.2 inch and 0.5 inch greater than the length A.

12. The massaging apparatus of claim 11, wherein the housing has a depth E and the cavity has a height H, the height H being between 0.2 inch and 0.5 inch greater than the depth E.

13. The massaging apparatus of claim 11, wherein the Length L is approximately 3.75 inch and the width W is approximately 2.75 inch.

14. The massaging apparatus of claim 13, wherein the height H is approximately 1.5 inch.

15. The massaging apparatus of claim 6, wherein the isolation device occupies at least 40 percent of an overall volume of the cavity.

16. The massaging apparatus of claim 1, further comprising a reinforcing sheet member laminated between the main cushion member and the outer cushion member.

17. The massaging apparatus of claim 16, wherein the outer cushion member is of substantially uniform thickness.

18. The massaging apparatus of claim 17, wherein the thickness of the outer cushion member is between 0.18 inch and 0.4 inch.

19. The massaging apparatus of claim 17, wherein the thickness of the outer cushion member is approximately 0.25 inch.

20. The massaging apparatus of claim 1, wherein the vibrator is one of a spaced plurality of vibrators, each vibrator being located in a corresponding counterpart of the cavity and having a corresponding isolation device interposed between the housing and the cavity.

21. The massaging apparatus of claim 20, wherein the outer cushion covers each of the cavities.

22. The massaging apparatus of claim 20, wherein the main cushion and the outer cushion form a seat pad of a seat.

23. The massaging apparatus of claim 22, in combination with a back pad of the seat, the back pad having counterparts of the vibrators, the main cushion, the isolation devices, and the outer cushion.

24. The massaging apparatus of claim 22, wherein the seat is one of a plurality of seats having a common structural element.

25. The massaging apparatus of claim 1, further comprising a heater unit fixably connected to the outer cushion member, the heater unit comprising:
   (a) a first sheet member having a silicon base fire-resistant adhesive coating on one side thereof for affixing the first sheet member to the outer cushion member;
   (b) a resistance wire disposed on the first sheet member opposite the adhesive coating thereof for forming a heater element;
   (c) a second sheet member having a silicon base fire resistant coating on one side thereof, the coating contacting the resistance wire and the second sheet member for securing the resistance member between the sheet members; and
   (d) a fire resistant power cord projecting from between the sheet members, respective conductors of the power cord being electrically connected between opposite ends of the resistance wire,
   wherein the first and second sheet members are formed of a polyamide film.

26. The massaging apparatus of claim 25, wherein each of the sheet members has a thickness of approximately 0.002 inch for providing sufficient structural integrity while effectively transmitting vibrations from the vibrator to a user having contact with the apparatus proximate the heater unit.

27. A vehicle seat comprising a structural member, a seat pad and a back pad supported relative to the structural member, the seat pad and the back pad each comprising:
   (a) a plurality of vibrator units, each vibrator unit including a housing, a motor supported within the housing, means for connecting the motor to a source of electrical power, the motor being coupled to a mass element for producing vibratory motion of the housing;
   (b) a main cushion member having a main supporting surface and being formed of a resilient material, a plurality of spaced apart cavities being formed therein and interrupting the supporting surface for receiving respective ones of the vibrator units, each cavity being sufficiently large to provide clearance space on all sides of the corresponding vibrator unit;
   (c) a plurality of isolation devices located in respective ones of the cavities; and
   (d) an outer cushion member having the vibrator units bonded thereto in spaced correspondence with the spacing of the cavities, the outer cushion member being bonded to the main supporting surface and covering the cavities with the vibrator units extending into the cavities, the isolation devices contacting bottom portions of the vibrator units, the isolation devices further contacting at least a portion of the main cushion member, and the isolation devices being interposed between the vibrator units and the main cushion member, the outer cushion member forming an outer supporting surface being spaced from the main supporting surface.

28. The vehicle seat of claim 27, further comprising a controller electrically connected to each of the vibrators for activating selected ones of the vibrators.

29. The vehicle seat of claim 27, wherein each of the isolation devices comprises a flexible sealed enclosure having a viscous material contained therein.

30. A massaging apparatus comprising:
   (a) a vibrator unit including a housing having a generally cylindrical body portion and a plate portion, the plate portion projecting from one side of the body portion by a distance greater than a width of the body portion;
   (b) a main cushion member having a main supporting surface and being formed of a resilient material, a cavity being formed therein and interrupting the supporting surface for receiving the vibrator unit, the cavity being sufficiently large to provide clearance space on all sides of the vibrator unit;
   (c) a structure supporting the main cushion member and having a structural member projecting in generally parallel relation to the main supporting surface for modifying a contour thereof;
   (d) an outer cushion member, the outer cushion member being bonded to the main supporting surface and covering the cavity, the outer cushion member forming an outer supporting surface being spaced from the main supporting surface, the main cushion member and the outer cushion member forming a seat pad of a seat, the seat including a structural member extending within the support structure in relatively closely spaced relation to a target zone region of the outer supporting surface, the vibrator unit being located within the cavity with the plate portion of the housing facing a target zone region of the outer cushion member in generally parallel relation thereto, the plate portion projecting between the structural member and the outer cushion member for imparting vibrations through the outer cushion member opposite the structural member, the body portion of the housing projecting away from the outer cushion member at one side of the structural member; and
   (e) an isolation device located in the cavity, the isolation device contacting at least a portion of the vibrator unit, the isolation device further contacting at least a portion of the main cushion member, wherein the isolation device is interposed between the vibrator unit and the main cushion member.

31. A method for coverting a padded support device to produce isolated massaging of a user's body, the device including a resilient main cushion, comprising:
   (a) providing a vibratory transducer having a housing and a control cable extending from the housing for driving the transducer;
   (b) forming a cavity in a supporting surface of the main cushion, the cavity being sufficiently large for receiving the transducer housing in spaced relation to the main cushion;

(c) placing the transducer housing in the cavity;

(d) positioning the control cable to extend from the cavity and on the supporting surface to an edge margin thereof;

(e) interposing a resilient isolation device between the transducer housing and the main cushion with a portion of the housing contacting and projecting into the isolation device and the isolation device contacting at least a portion of the main cushion;

(f) providing a resilient pad member for covering the supporting surface;

(g) bonding a reinforcing sheet member to a bottom surface of the pad member; and (h) bonding the shet member to the supporting surface, the sheet member being laminated between the main cushion and the pad member and covering the cavity with the vibrator being mechanically coupled through the sheet member to the outer cushion member for transmitting vibration thereto, the isolation device at least partially blocking the transmission of vibrations into the main cushion.

32. The method of claim 31, wherein the enclosing comprises completely enclosing the transducer housing with the isolation device, the isolation material having a volume of not less than 40 percent of a volume of the cavity.

33. The method of claim 31, wherein the placing and enclosing comprises fastening the transducer onto the sheet member in fixed relation to the pad member prior to bonding the sheet member to the supporting surface.

34. The method of claim 33, wherein the transducer is one of a plurality of transducers, the forming is of a corresponding plurality of spaced apart cavities, and the fastening includes spacing the transducer on the sheet member in correspondence with the spacing of the cavities.

* * * * *